(12) United States Patent
Pearson

(10) Patent No.: US 6,619,733 B2
(45) Date of Patent: Sep. 16, 2003

(54) PASSENGER SEAT HEADREST PLATFORM

(75) Inventor: Steven E. Pearson, Lynnwood, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/989,851

(22) Filed: Nov. 19, 2001

(65) Prior Publication Data

US 2003/0094843 A1 May 22, 2003

(51) Int. Cl.[7] ................................................ A47C 7/38
(52) U.S. Cl. ........................ 297/112; 297/113; 297/391; 297/488; 297/408
(58) Field of Search ........................ 297/112–114, 116, 297/117, 154, 391, 488, 238, 408, 487; 108/65, 69

(56) References Cited

U.S. PATENT DOCUMENTS

| | | | |
|---|---|---|---|
| 3,544,161 A | * 12/1970 | Bryden | ...................... 297/391 |
| 4,159,071 A | 6/1979 | Roca | |
| 4,281,874 A | 8/1981 | Iwans et al. | |
| 4,431,231 A | 2/1984 | Elazari et al. | |
| 4,511,178 A | 4/1985 | Brennan | |
| 4,519,648 A | 5/1985 | Jovanovic | |
| 4,756,573 A | * 7/1988 | Simin et al. | .............. 297/250.1 |
| 4,943,112 A | * 7/1990 | Law | ............................ 297/238 |
| 4,986,600 A | * 1/1991 | Leblanc et al. | ............. 297/238 |
| 5,000,511 A | * 3/1991 | Shichijo et al. | ........ 297/188.05 |
| 5,607,203 A | * 3/1997 | Sedlack | ................. 297/256.15 |
| 5,800,012 A | * 9/1998 | Ziegler | ................... 297/216.11 |
| 5,876,092 A | 3/1999 | An | |

* cited by examiner

Primary Examiner—Peter R. Brown
(74) Attorney, Agent, or Firm—Black Lowe & Graham PLLC

(57) ABSTRACT

A passenger headrest is platform deployable and stowable from a passenger seat. The platform operates as a rear headrest and is pivoted to a forward position to serve as a forward leaning face-headrest. The headrest includes a headrest platform that is attached to an adjustable post made of tubular construction and having a plurality of holes. The adjustable post is concentrically dimensioned to be slidably received by a tubular bar. The tubular bar has a set of holes and is pivotably attached to the passenger seat. A first connector secures the adjustable post and tubular bar to each other. The headrest is pivotable through a range of motion adjusted by a passenger, wherein the passenger selects an inclination angle. The inclination angle used by the passenger is established via a second connector that secures the tubular bar to the seat.

4 Claims, 16 Drawing Sheets

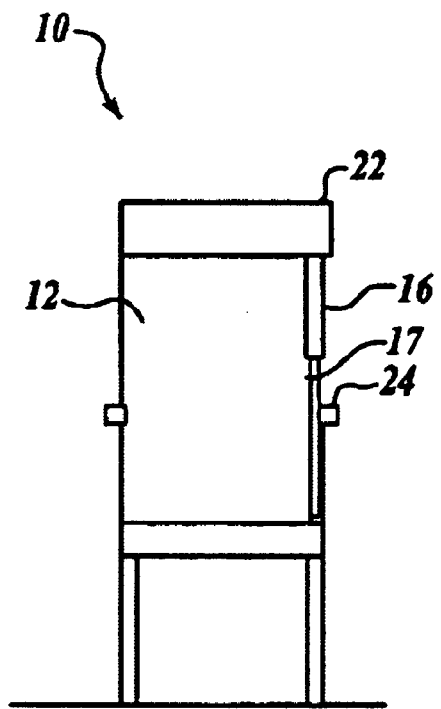 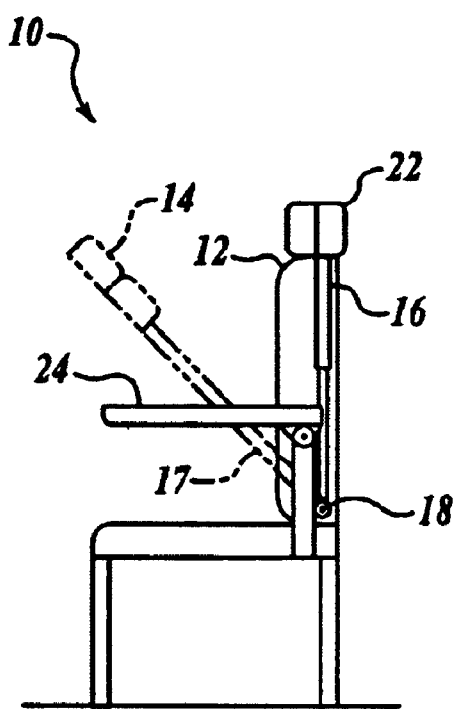
*Fig. 2A.*   *Fig. 2B.*

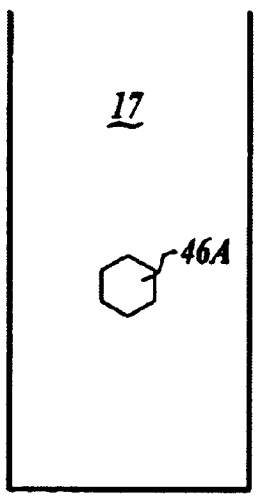
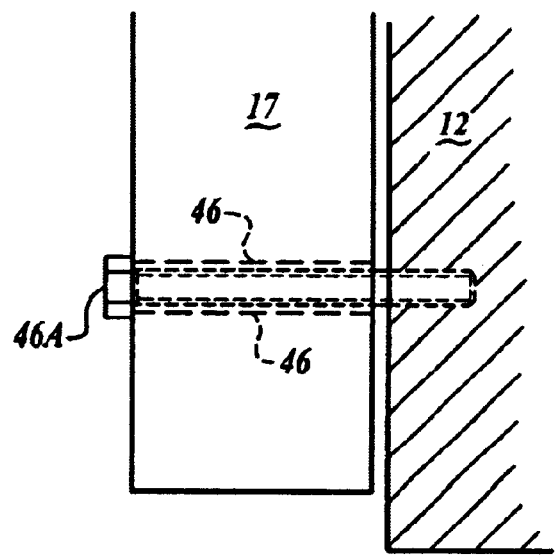
Fig. 4C.   Fig. 4D.

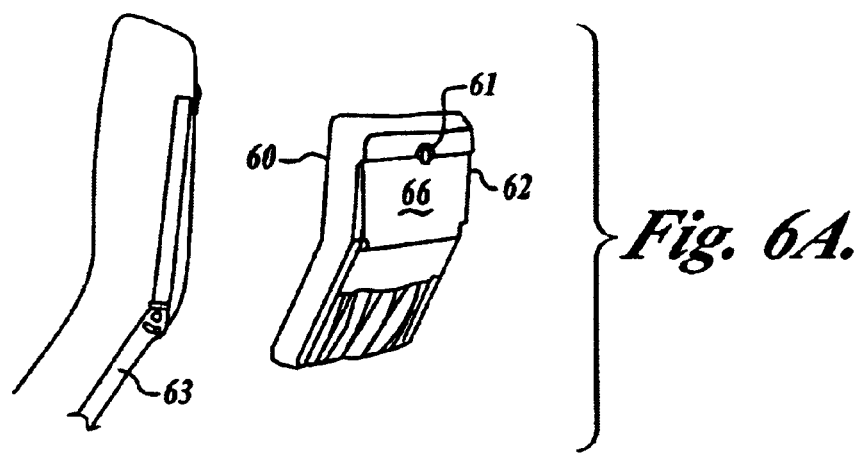
*Fig. 6A.*
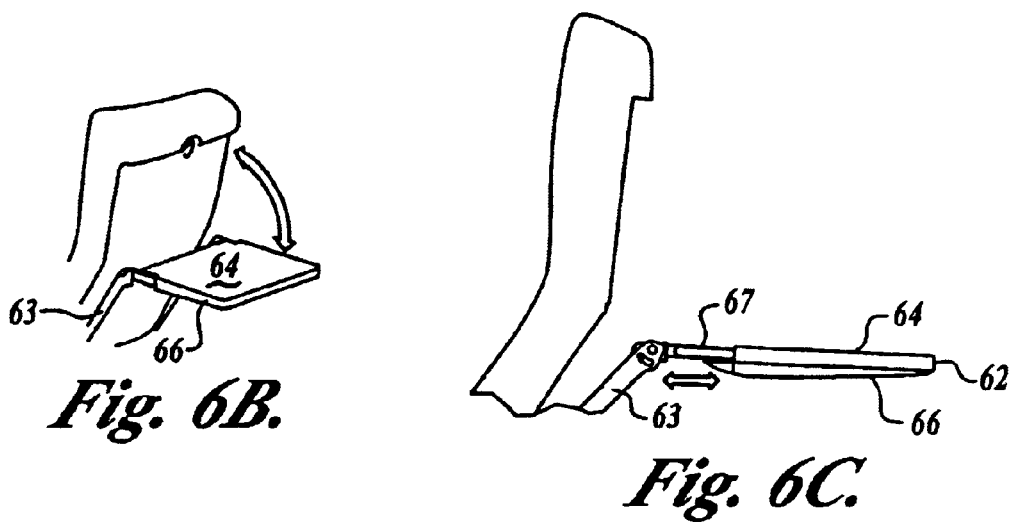
*Fig. 6B.*
*Fig. 6C.*
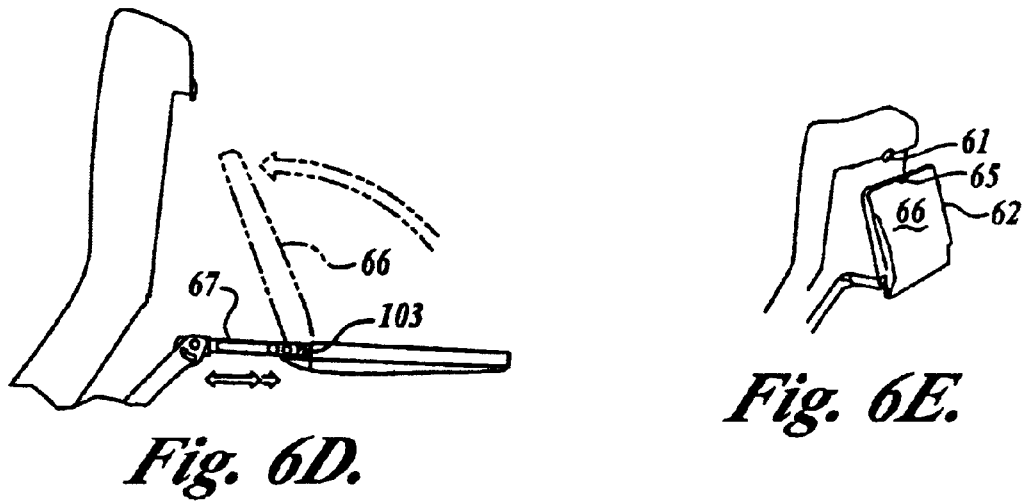
*Fig. 6D.*
*Fig. 6E.*

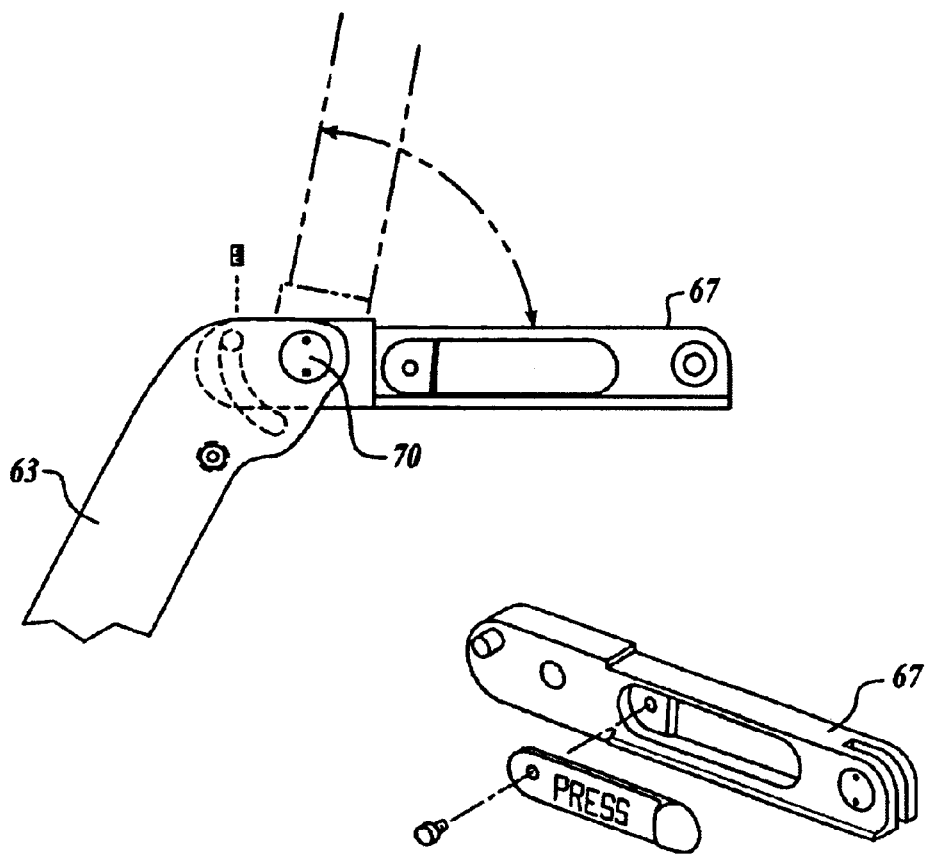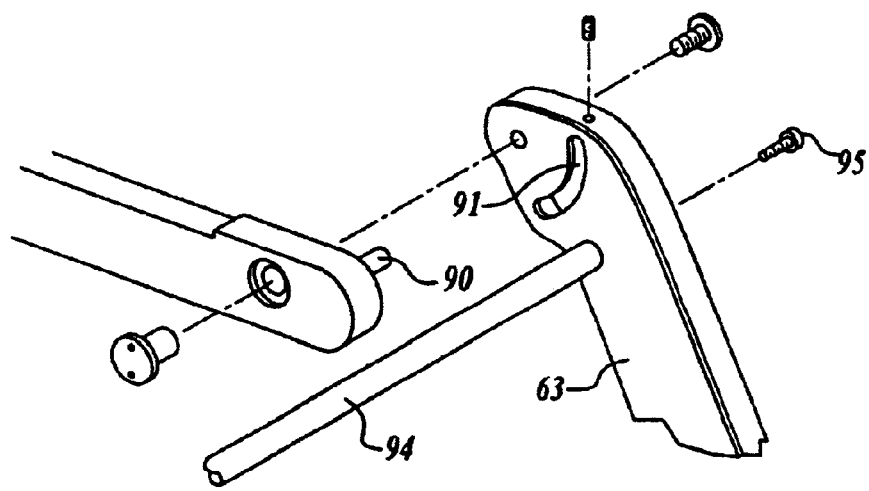
Fig. 9.

PASSENGER SEAT HEADREST PLATFORM

FIELD OF THE INVENTION

This invention relates generally to a headrest and, more particularly, to a passenger seat headrest platform.

BACKGROUND OF THE INVENTION

In contrast to passengers seated in a first class section of an airplane, train, bus, or other transport vehicles, passengers seated in economy class are more squeezed for space. This results in a more crowded and fatiguing trip for those passengers riding in economy class sections of airplanes, trains, buses, or other transport vehicles. Unlike first class, cramped economy class passengers do not have space to rest their heads in comfort or stretch to relax. Tired passengers in economy class often, sometimes unintentionally, rest their heads on the shoulder of adjacent passengers and fall asleep. A surprise awakening then occurs as the adjacent passenger nudges the sleeping passenger.

Given these cramped conditions, an economy class passenger can only bend forward to rest his or her head. Food trays, which drop from the back sections of forward seats, are deployed at lap level and are too low for resting one's head. Furthermore, the hard surfaces of food trays makes it difficult to comfortably rest one's head.

Cramped passengers need a means to sleep or rest in relative comfort while in a sitting position. Such a comfort level would be achieved similarly as when a person sits at a desk, leans forward, and rests his or her head and arms on the desk's surface. Thus, there is an unmet need in the art to provide passengers a similar option that allows them to slightly lean forward, and then place their heads and arms onto a padded rest deployed in a position higher than is possible with drop down, lap-deployed food trays, and at a passenger-selected inclination angle and height.

SUMMARY OF THE INVENTION

Three embodiments of the invention permit passengers to slightly lean forward and place their heads and arms onto a padded headrest deployed in a position higher than is possible with a drop down, lap-deployed food trays. Two embodiments allow the passenger to use a deployed padded headrest without being affected by the seatback recline adjustments made by a passenger sitting in forward seat. In another embodiment the deployed padded headrest is susceptible to seatback recline interference caused by a passenger seated in forward seat who proceeds to make seatback recline adjustments.

An embodiment not susceptible to recline interference is the sleep bar. The sleep bar serves as a back-of-the-neck headrest and a forward face-headrest. When in a neutral or undeployed position, the sleep bar is in a stowed position, essentially collinear with and a secured into the passengers seat. In the stowed position, the sleep bar serves as a cushioned back-of-the-neck headrest for the passenger.

The sleep bar is a passenger headrest that is platform deployable and stowable from a passenger seat. The platform operates as a rear headrest and is pivoted to a forward position to serve as a forward leaning face-headrest. The headrest includes a headrest platform that is attached to an adjustable post made of tubular construction and having a plurality of holes. The adjustable post is concentrically dimensioned to be slidably received by a tubular bar. The tubular bar has a set of holes and is pivotably attached to the passenger seat. A first connector secures the adjustable post and tubular bar to each other. The headrest is pivotable through a range of motion adjusted by a passenger, wherein the passenger selects an inclination angle. The inclination angle used by the passenger is established via a second connector that secures the tubular bar to the seat.

When the sleep bar is moved forward from its stowed undeployed position, it can be pivoted to a comfortable inclination angle and elevation adjusted to the preferred height as desired by the passenger. It is then secured by various locking connectors (to secure the adjusted height) or clamping connectors (to secure the adjusted inclination angle) by the passenger to establish the passenger's preferred deployed position for the headrest platform. In the deployed position, the passenger slightly leans forward and rests his or her forehead or side of the head on the cushioned sleep bar headrest platform.

The cushioned sleep bar platform offers several advantages. It is integral to the passenger's seat and its stowed and deployed position is controlled specifically by the passenger. The passenger has the option to convert the sleep bar's back-of-the-neck headrest function to a forehead headrest function simply by deploying the sleep bar to a forward angle-adjusted and height-adjusted position. The cushioned sleep bar's inclination angle position is not affected by nearby forward sitting passengers as it is deployed from the seat of a sitting passenger who makes the inclination angle and height adjustments.

Another embodiment of the invention not susceptible to seatback recline interference is a single-toggle padded food tray which is deployed from the seatback of a forward sitting passenger. The single-toggle padded food tray provides two functions. One function is to provide a hard food-serving surface deployed at lap-level, the other function is to provide a forward face-padded headrest deployed at a passenger selected height and inclination angle similar in function to the sleep bar. The single-toggle padded food tray, though deployed from the rear seatback of a forward sitting passenger seat, is not affected by seatback recline interference because it pivots from a stationary section of the forward sitting passenger seat.

An embodiment that is susceptible to seatback recline interference is a dual-toggle padded food tray that is also deployed from the moveable seatback of a forward passenger seat. As with the single-toggle invention, the dual-toggle invention also provides a lap-level food-serving surface and a forward leaning chest-to-head level padded surface for face resting. Because the dual-toggle embodiment deploys from the non-stationary forward seatback, it is susceptible to seatback recline interference. The height and inclination angle selected by the passenger will vary slightly with the seat recline adjustments made by the forward seated passenger. Nevertheless, the dual-toggle invention offers many of the same advantages as the single-toggle invention and the sleep bar invention that are not susceptible to seatback recline interference. In the deployed position the dual-toggle provides a cushioned head-resting surface that can be initially adjusted to a passenger-preferred angle of inclination and height, and also provides a lap-level hard food-serving surface.

As will be readily appreciated from the foregoing summary, all embodiments of the invention provide a forward head-resting surface that can be adjusted to a passenger preferred height and inclination angle. Embodiments of the invention are readily ascertained from the following drawings and detailed descriptions.

BRIEF DESCRIPTION OF THE DRAWINGS

The preferred and alternative embodiments of the present invention are described in detail below with reference to the following drawings.

FIG. 2A is a front view of passenger seat with sleep bar in stowed and folded closed position for back-of-the-neck or rear head resting position;

FIG. 2B is a side view of the passenger seat showing the folded sleep bar in the stowed (rear headrest) and deployed (face headrest) position;

FIG. 4C is an expanded front view showing a bolt placed in the pivot hole of the inner bar;

FIG. 4D is an expanded side view of the inner bar and seatback showing the bolt connecting through and securing into the seatback;

FIGS. 6A–D depict the operation of the single-toggle padded food tray;

FIG. 6A is an angled view of the stowed, single-toggle padded food tray with padded surface facing outward;

FIG. 6B is the deployed single-toggle padded food tray with hard surface facing up;

FIG. 6C depicts the lateral movement of the single-toggle padded food tray with hard surface face up, horizontal and lap-level;

FIG. 6D depicts pivotal movement of single-toggle padded food tray with padded surface pivoted into the top position;

FIG. 6E is the single-toggle padded food tray with the padded surface in the face up position being positioned for face head resting as selected by the passenger;

FIG. 9 depicts the tray arm to tray leg assembly which prevents forward sitting passenger recline tilt interference;

DETAILED DESCRIPTION OF THE INVENTION

Figure 1A:
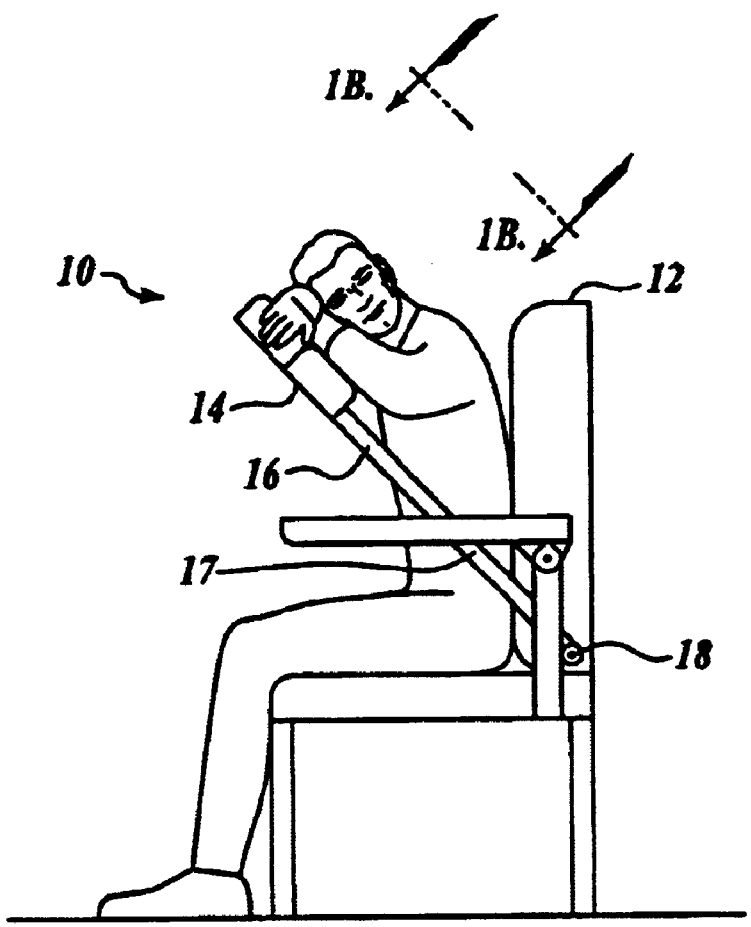
FIG. 1A is a side view of a passenger seat with sleep bar deployed in the forward face-resting position with the sleep bar surface unfolded in a secured position.
Figure 1B:
FIG. 1B is a top view of passenger seat with sleep bar deployed in the forward face-resting position with the sleep bar surface unfolded in a secured position.

An embodiment free of forward seated passenger recline interference is shown in FIGS. 1A and 1B. A sleep bar 10 serves as a rearward and face-ward padded headrest. Operational utility of the sleep bar 10 is depicted in FIG. 1A. Here a sleeping passenger in passenger seat 12 is able to sleep in a forward headresting position A—A on a deployed sleep bar platform 14. The position of the sleep bar 10 is totally under control by the passenger. Extension or height is controlled by adjustable post 16 that slides along inner post 17. The angle of the sleep bar is adjusted through a pivoting point 18. FIG. 1B shows the top view of the operational utility of the sleep bar. Here the passenger is resting on the sleep bar platform 14 that is deployed in a forward head resting position A—A and held in position by adjustable post 16 and a clamping means near point 18. The plurality of configurations for the sleep bar 10 is depicted in FIGS. 2A and 2B.

FIG. 2A shows a view of the passenger seat 12 with the stowed sleep bar 10.

Headrest 22 is on the top of the passenger seat 12. The folded headrest platform 22 is stowed in a vertical position parallel to the spine of the passenger seat 12. The folded headrest platform 22 is supported by adjustable post 16 secured by a locking means to inner post 17. The inner post 17 resides aft to armrest 24. FIG. 2B is a side view that represents possible configurations, angles, and adjustment extensions or heights from the folded stowed position 22 to the deployed position 14 depicted inside armrest 24. The folded platform 22 is in pillow configuration to the passenger seat 12. Vertical headrest 22 is attached to adjustable post 16 that is secured to inner bar 17. The forward angle of the sleep bar 10 is controlled through pivot point 18 in which the vertical sleep bar 10 is unfolded at position 14 in the forward position to any angle preferred by the seated passenger.

Figure 3:
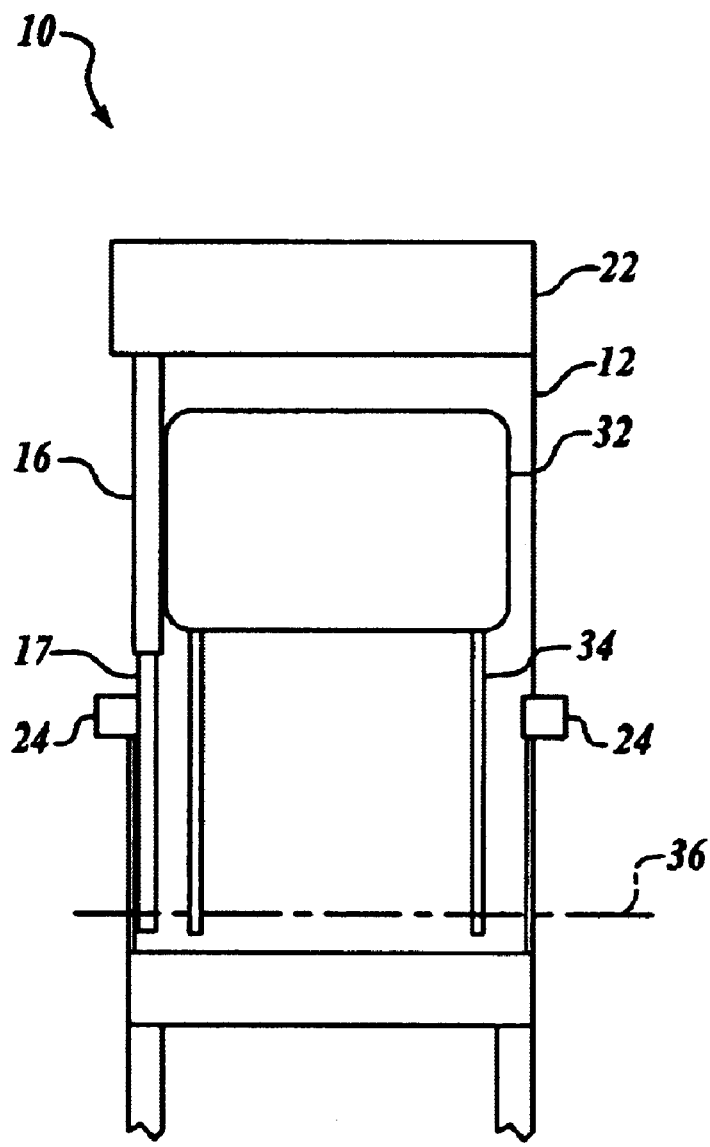
FIG. 3 is a rear view of the passenger seat with sleep bar in the stowed and folded position.

The relation of the folded sleep bar 10 to other components of the seat 12 is described in rear view FIG. 3. A conventional food tray 32 with leg supports 34 is shown in a stowed position. Here the folded headrest platform 22 rests on top of the passenger seat 12 secured by adjustable post 16. Inner bar 17 is internal to armrest 24 and is turned along pivoting axis 36.

Figure 4A:
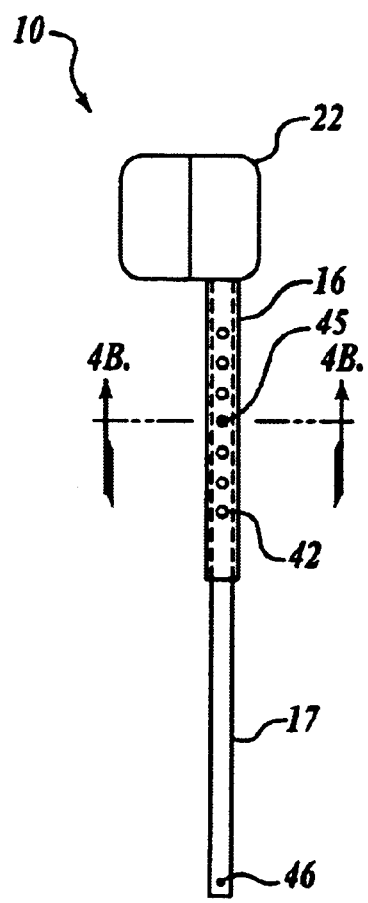
FIG. 4A is a sleep bar assembly in folded rear headrest position.

Adjustment of height of the sleep bar is shown in FIG. 4A. In adjustable post 16 resides a plurality of positioning holes 42 which are linearly aligned. Similarly, there resides near the upper end on inner bar 17 a securing hole 45. As adjustable post 16 slides along inner post 17 the bar height is locked into position as the positioning holes 42 of adjustable post 16 aligns with components of a positioning post locking mechanism (not shown), near view line B—B, and the upper end hole of inner bar 17. Inner bar 17 has a pivot hole 46 wherein inner bar 17 is secured to the passenger seat via a bolt or equivalent connector.

Figure 4B:
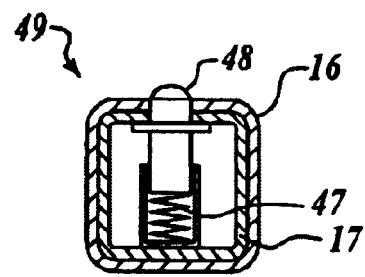
FIG. 4B is a sleep bar height positioning locking mechanism.

FIG. 4B is a cross-sectional view of axial view B—B showing a depiction of the positioning post locking mechanism 49. The extension or height of the sleep bar 10 is affected as the hollow adjustable post 16 is slid along hollow, inner post 17, causing an alignment of positioning holes 42 with securing hole 45. When this alignment occurs, a spring-loaded cylinder 47 pushes a positioning peg 48 through the aligned securing hole of inner bar 17 and positioning hole 42 of outer positioning post 16. The positioning peg 48 is flanged to prevent its expulsion from the positioning post locking mechanism 49. Once the sleep bar 10 is adjusted to a passenger-preferred height, it is pivoted into an angled position for forward sleeping.

FIG. 4C is an expanded front view showing a bolt 46A placed in the pivot hole 46 (not shown) of the inner bar 17. FIG. 4D is an expanded side view showing the bolt 46A (shown partially in phantom) penetrating and extending though the hole 46 (shown in phantom) of inner bar 17 and securing into the seatback 12. The bolt 46A provides the pivoting means for the passenger to select an inclination angle for use of the sleep bar 10 and the securing means to maintain the selected inclination angle by tightening against and into the seatback 12.

Figure 5:
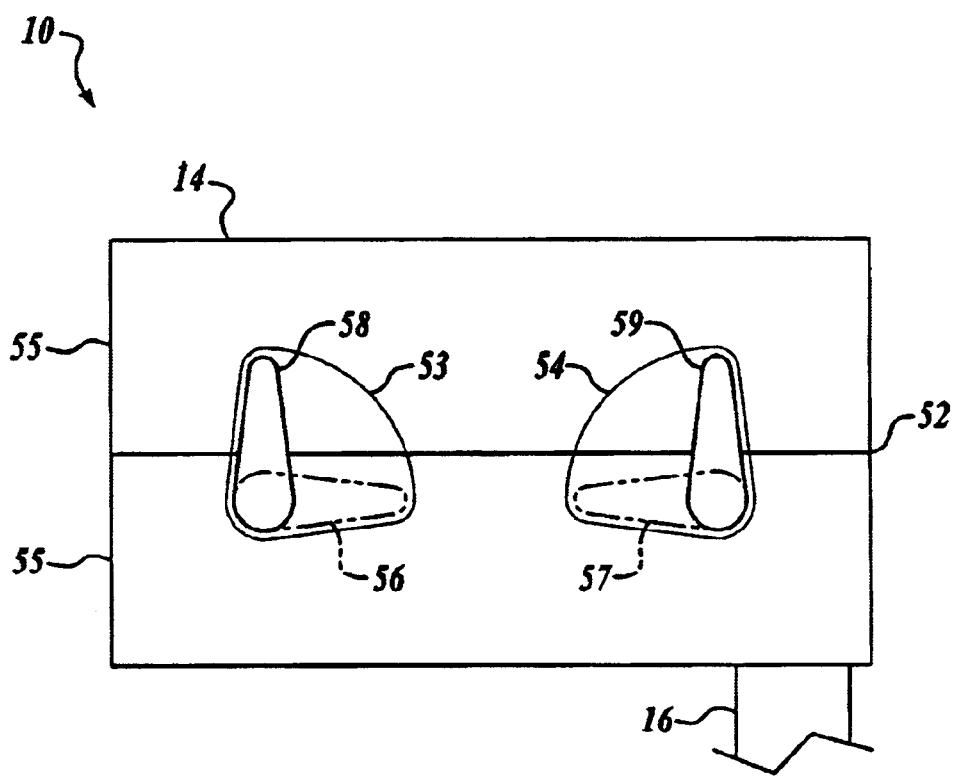
FIG. 5 is an underside of sleep bar headrest platform in the open and locked position.

FIG. 5 shows how the sleep bar 10 is unfolded. Along pivoting access 52 the two halves of the platform pads 55 are opened and reveal two hidden positioning switches, 56 and 57, which are used to secure the two padded halves 55 into a locked open and unfolded position. Positioning switches 56 and 57 are pivoted into an engaged position 58 and 59. Positioning switch 56 rotates in recess 53 and positioning switch 59 rotates in recess 54. The unfolded deployed sleep bar 10 is shown attached to positioning post 16.

Another embodiment of the invention independent of forward passenger recline interference is the single-toggle padded food tray 62 which contains a hard food-serving surface and a padded, pillow like surface 66. The single toggle padded food tray is secured into a recess of a seatback with a toggle latch 61 engaged against a catch of the food tray. The toggle latch 61 can be rotated to engage or disengage the catch of the food tray. As shown in FIG. 6A, seat 60 contains a stowed single-toggle padded food tray 62 secured by a toggle 61 and tray legs 63. As shown, the padded surface 66 is stowed vertically, secured by toggle 61 engaged against the food tray latch (not shown). As toggle 61 is rotated as indicated in FIG. 6B, a conventional food tray is pivoted about tray legs 63 downward to lap level with the hard surface 64 face up in a deployed position. In side view FIG. 6C, the hard surface 64 is face up and the padded surface 66 is face down. As lateral motion is applied to the single-toggle padded food tray 62 towards the passenger, tray arm 67 is partially revealed. Then, as depicted in FIG. 6D, the single-toggle padded food tray is rotated until it reaches a tray stop. Padded surface 66 is now in an angled and upwardly deployed position for use by the passenger. Finally, as depicted in FIG. 6E, the passenger preferred angle of rotation for using the single-toggle padded food tray 62 is then secured with the padded surface 66 face up. The tray 62 latch 65 displaced from toggle 61.

Figure 7A:
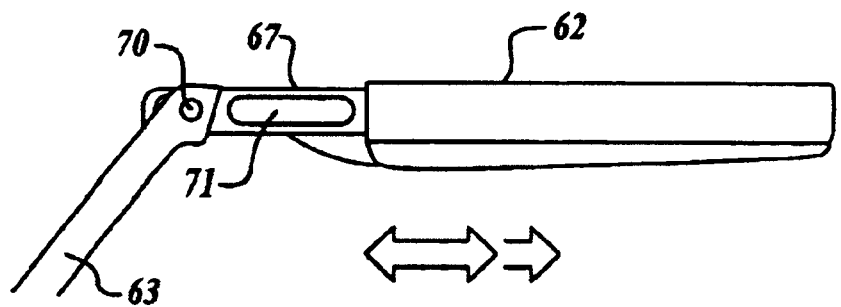
FIG. 7A is a side view that more closely shows the single-toggle padded food tray subjected to lateral movement.
Figure 7B:
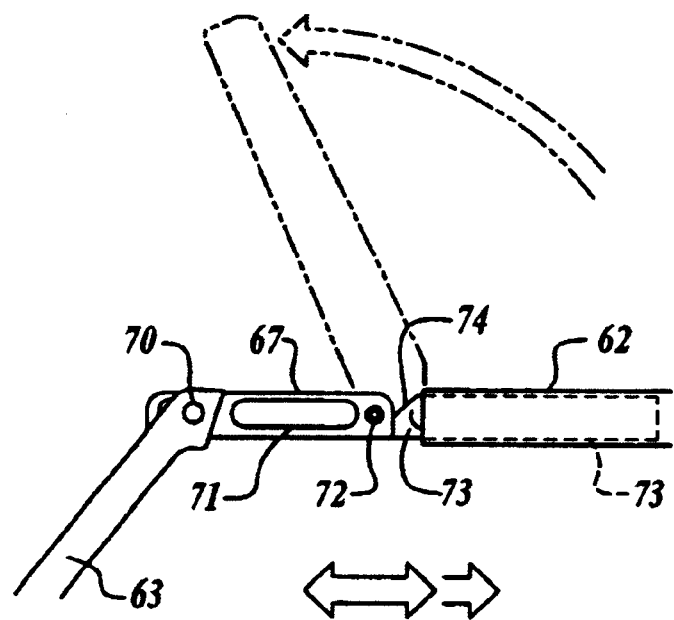
FIG. 7B is a side view that more closely shows the single-toggle padded food tray subjected to pivotal movement.

FIGS. 7A and 7B depict how the single-toggle padded food tray 62 is subjected to horizontal and pivotal motion. In FIG. 7A, depressing catch 71 allows passenger to extend lateral movement of tray 62, revealing tray arm 67. The single-toggle padded food tray 62 is pulled toward the passenger along tray arm 67 that is attached to tray legs 63 via the tray arm pivots 70. As the passenger continues to pull the single-toggle padded food tray closer to the passenger as shown in FIG. 7B, tray forearms 73 are partially revealed. The remainders of the tray forearms 73 are still inside the single-toggle padded food tray slide cavity as indicated by the dashed lines. The passenger is then able to pivot the single-toggle padded food tray 62 about the forearm pivot 72 attached to tray arm 67, which is in turn connected to the tray legs 63 via the tray arm pivots 70. The pivotal rotation continues until the beveled tray stop surface 74 of the tray forearm 73 engages against the upper ridge of tray arm 67, located above latch 71.

Figure 8A:
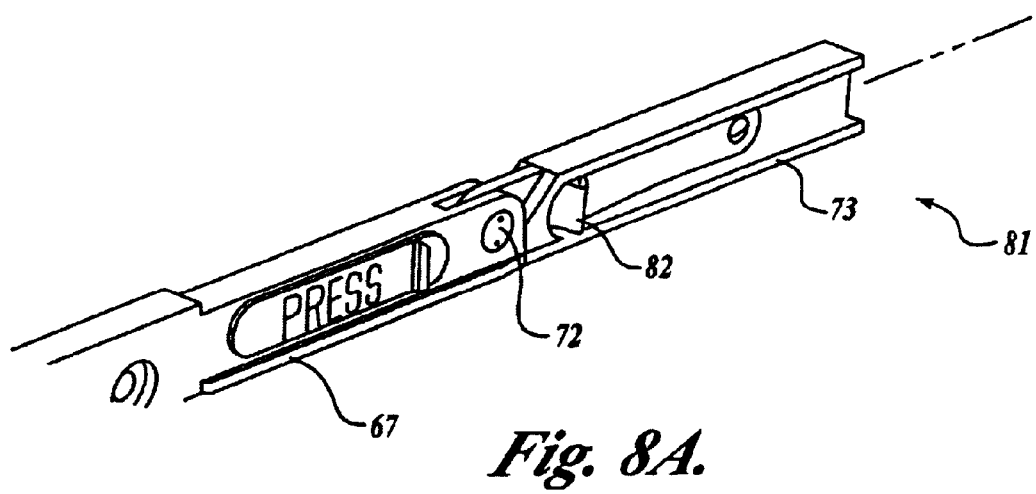
FIGS. 8A, 8B, and 8C depicts the mechanical positioning of the extended bar stop into the single-toggle padded food tray slide cavity.
Figure 8B:
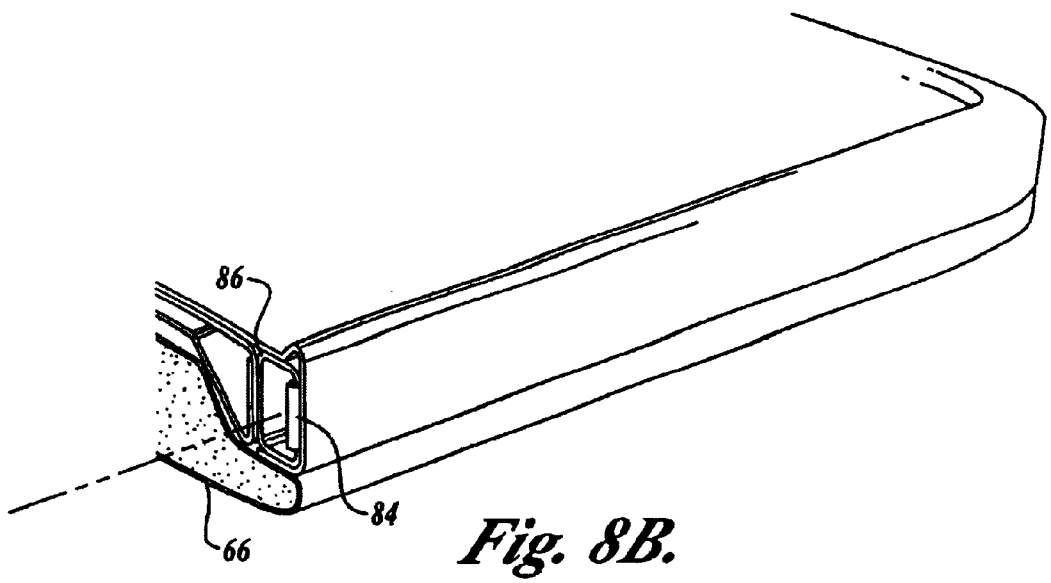
Figure 8C:
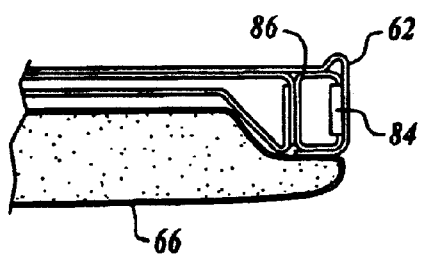

FIGS. 8A, 8B, and 8C describe the mechanical relationship of how the extended bar stop 81 fits into the single-toggle padded food tray slide cavity. In FIG. 8A, the extended bar stop 81 includes the tray arm 67 in linear alignment with the tray forearm 74 connected via the forearm pivot 72. On the tray forearm 73 resides a tray catch 82. In FIG. 8B, the extended bar stop 81 is then inserted into the single toggle padded food tray's 62 tray slide cavity 86 whereupon the tray catch 82 engages into cavity clip 84. Padded surface 66 is shown face down. FIG. 8C shows a partial cross-sectional view of the single-toggle padded food tray 62 wherein the tray slide cavity 86 contains the cavity clip 84 located on the side of the slide cavity 86 which is in turn interior to the food service tray 62. The cushioned comfort pad 66 is shown facing downward.

FIG. 9 depicts how the tray arm to tray leg assembly is prevented from forward sitting passenger recline tilt interference. To the tray leg 63 is attached the tray arm 67 which has an arm follower pin 90 which slides within pin slot cavity 91. Tray arm 67 is secured to the companion tray arm via an interconnecting tie rod 94 that is secured to the tray arm 67 with a tie rod securing screw 95 engaged at each end of the tie rod 94 inserted through each companion tray arm 67. Tray legs 67 are distally connected to bottom of forward passenger seat separated from the tilting seatback. The pivotal motion of tray arm 67 about the tray leg 63 occurs when following pin 90 slides within pin slot cavity 91 as the tray arm 67 is pivoted about tray arm pivot 70.

Figure 10A:
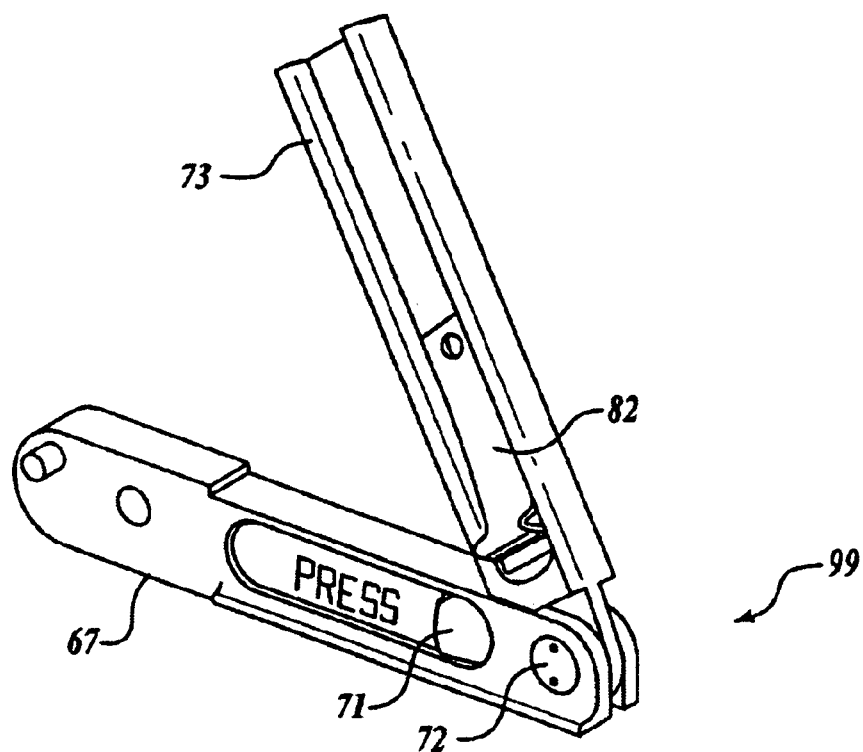
FIG. 10A displays the angular device positioning mechanism of the single-toggle padded food tray.
Figure 10B:
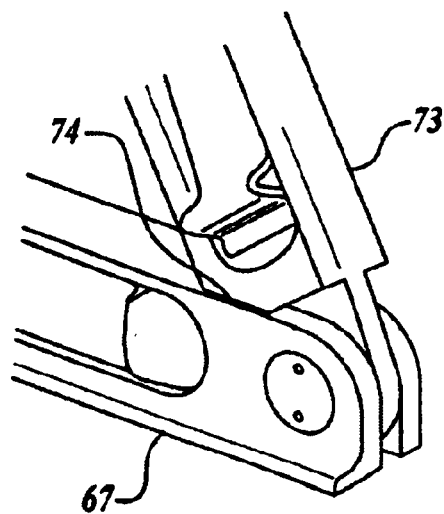
FIG. 10B depicts a magnified portion of the angular device positioning mechanism.

FIGS. 10A and 10B displays the angular device positioning mechanism 99 of the single-toggle padded food tray. FIG. 10A depicts the arrangements of parts of the complete positioning mechanism 99 wherein ray arm 67 with latch 82 is shown articulated to tray forearm 73 via forearm pivot 72. On tray forearm 73 is tray catch 62. As shown in FIG. 10B, the pivotal motion of tray forearm 73 is stopped as the beveled tray stop surface 74 engages against the upper ridge of tray arm 67.

Another embodiment similar to the single-toggle padded food tray is the dual-toggle padded food tray. The dual-toggle padded food tray is similarly a comfort padded food tray and food tray assembly, which is attached to the forward passenger seatback via a tray leg pivot. Though the dual-toggle padded food tray offers similar service tray and sleeping surface functionality, because it is pivotally deployed directly from the forward sitting passenger seatback, the dual-toggle padded food tray is subject to recline tilt interference.

Figure 11:
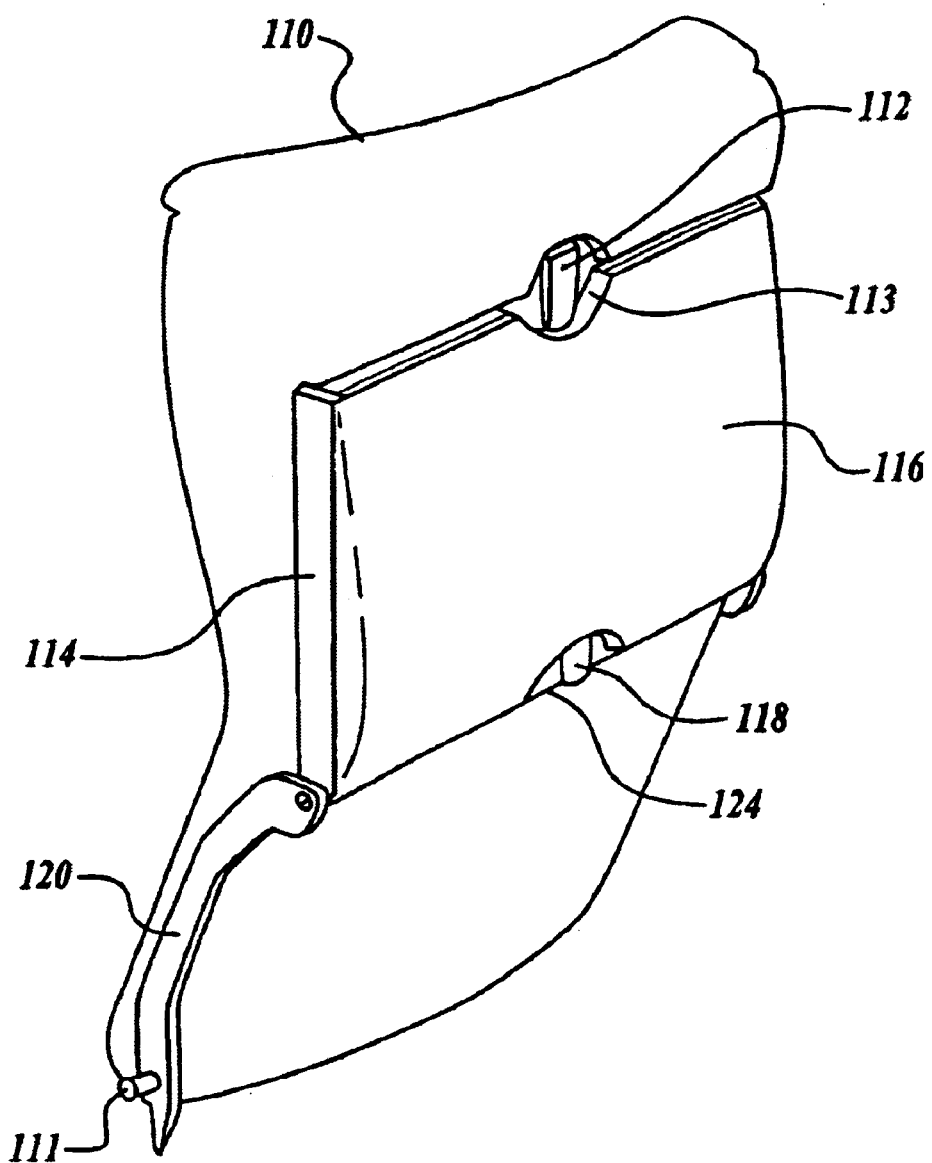
FIG. 11 shows the dual-toggle padded food tray in a stowed position in the seatback of tiltable seat.

FIG. 11 shows the dual-toggle padded food tray 114 in a stowed position in the seatback of forward sitting passenger seat 110 where the padded surface 116 is facing outward. In the stowed position are visible two toggle latches. The upper toggle latch is the food tray toggle latch 112 secured by food tray toggle catch 113 and the lower toggle latch is the comfort pad toggle latch 118 secured by catch 124. Dual-toggle padded food tray 114 is secured by pivoting about tray legs 120.

Figure 12:
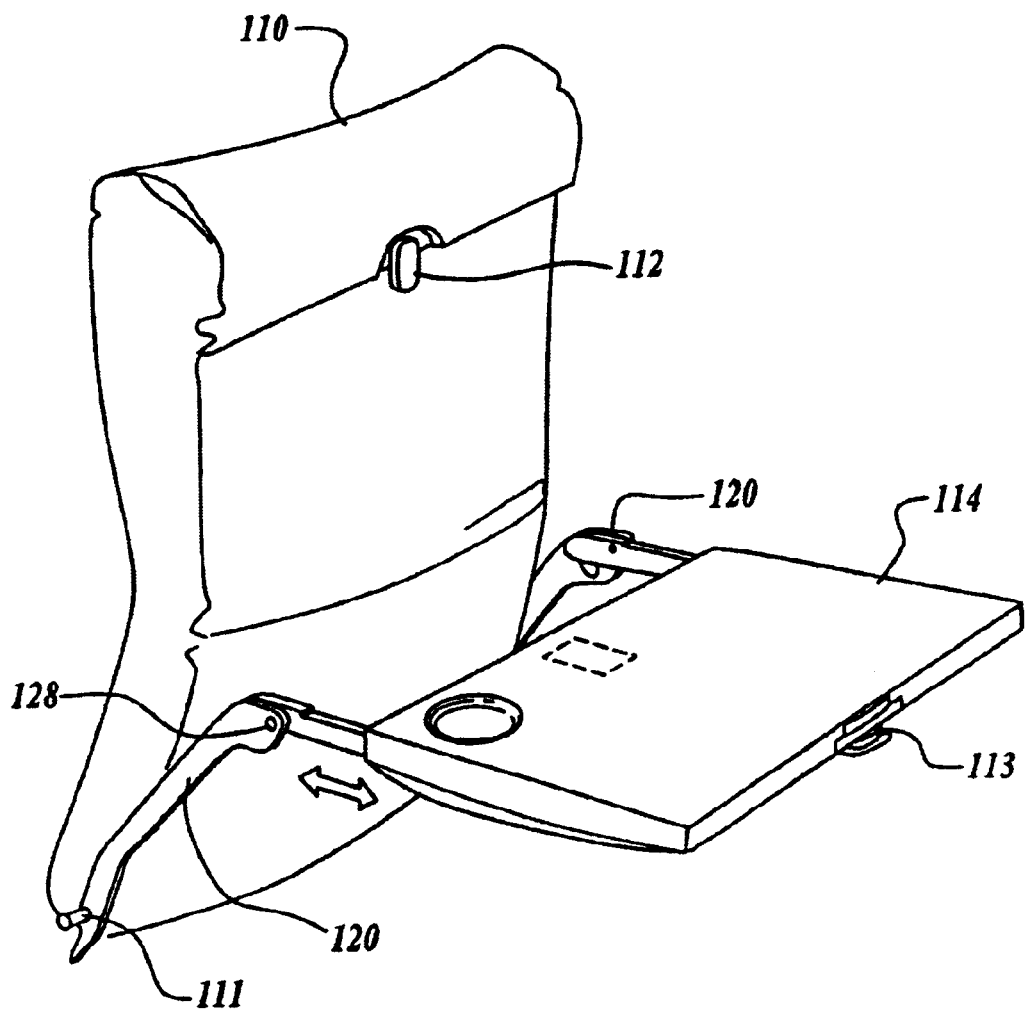
FIG. 12 displays dual-toggle padded food tray in a lap level horizontal position showing the lateral movement of the tray.

In FIG. 12, the food service tray 114 from seatback 110 is shown in a deployed position through pivots. As toggle latch 112 is pivoted clear from catch 113, the food service tray 114 falls with gravity to lap level as it pivots through tray pivots 128 securing tray bayonets 122 to tray legs 120. Tray legs 120 are attached to tiltable seatback 110 via seatback and tray leg pivots 111.

Figure 13:
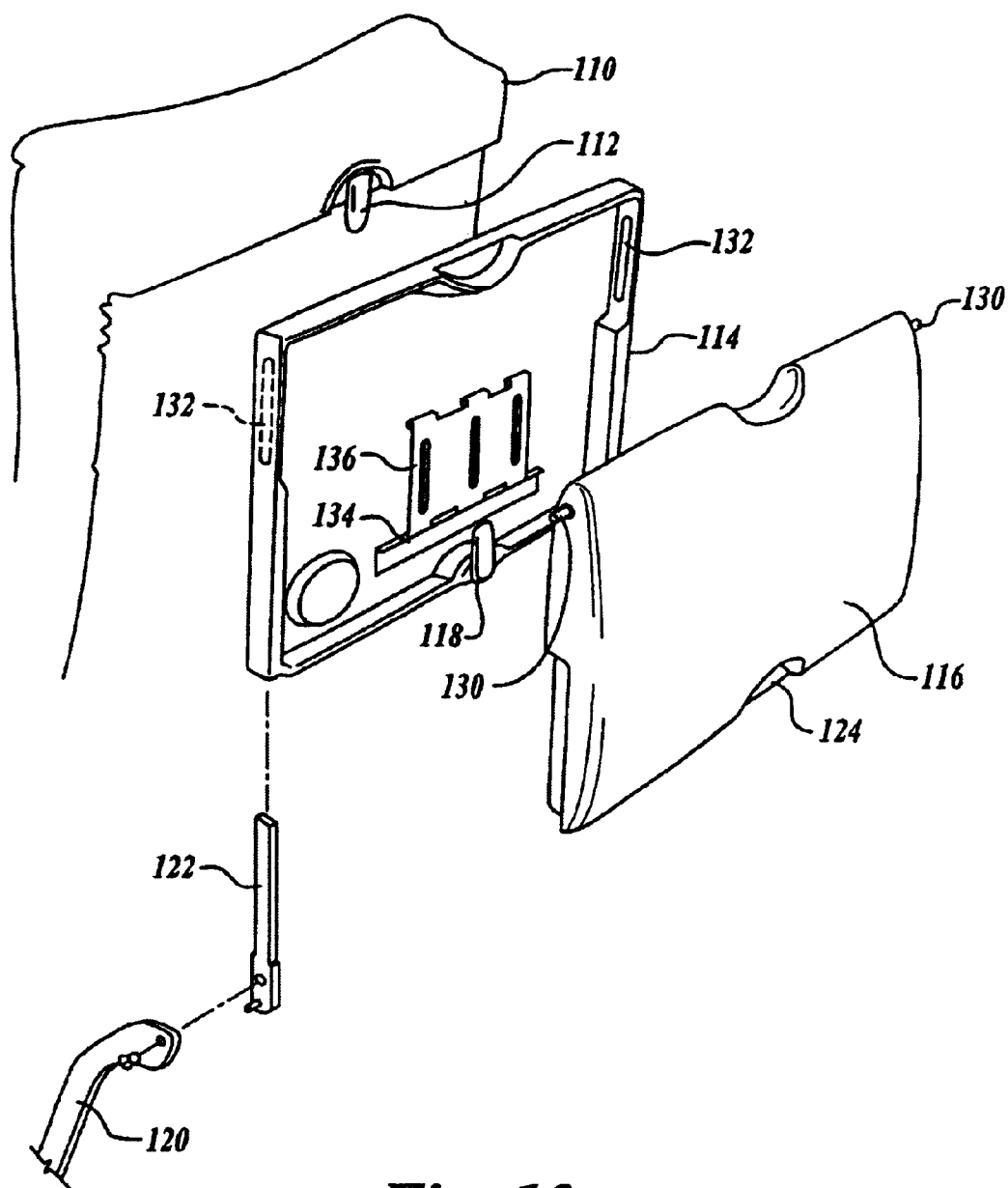
FIG. 13 depicts an exploded view of the dual-toggle padded food tray in relation to seatback.

FIG. 13 depicts an exploded view of the dual-toggle padded food tray 114 in seatback 10. Internal structures include slots 132, hinge 134, and pivot link 136. Toggles 112 and 118 are shown in an engaged vertical position. Dual-toggle padded food tray 114 is shown directly projecting from tray bayonets 122, which in turn are connected to tray legs 120. Padded surface 116 contains two spring-loaded slide pins 130, located at the top end of padded comfort rest 116.

Figure 14:
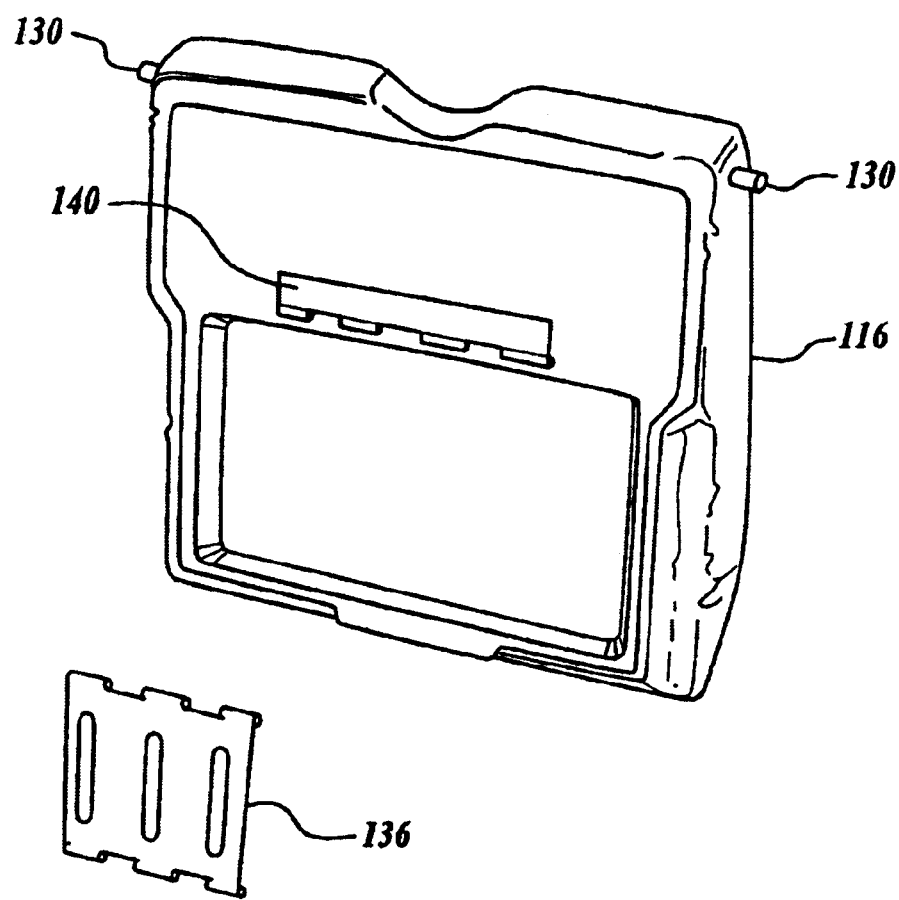
FIG. 14 more details of the internal structures of the comfort pad secured to the vertically stowed food tray.

FIG. 14 depicts more details of the internal structures of the padded surface 116 wherein two spring-loaded pins 130 are shown for reference. The planar design of the pivot link 136 imparts stability to the padded surface when deployed to prevent wobbling and is secured to the internal side via a comfort pad hinge 140.

Figure 15A:
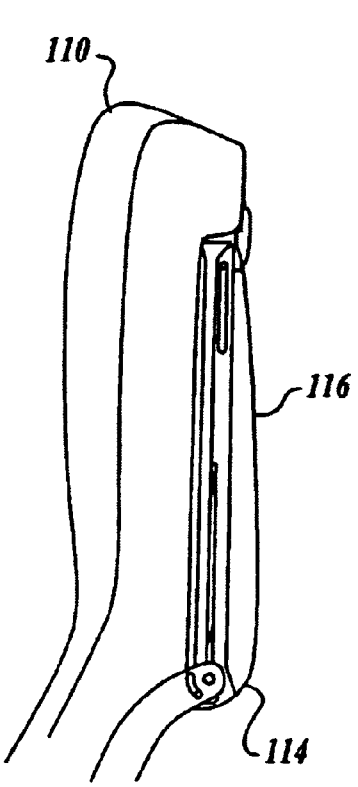
FIGS. 15A, 15B, and 15C depicts the deployment of the comfort pad of the dual-toggle padded food tray assembly.
Figure 15B:
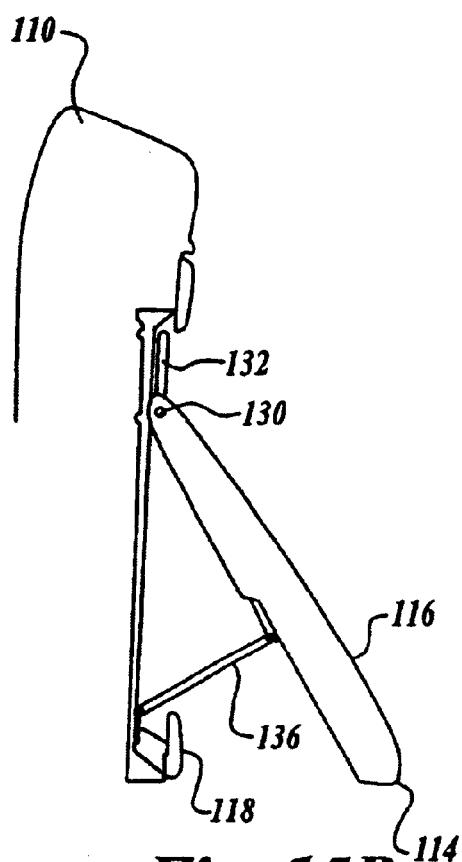
Figure 15C:
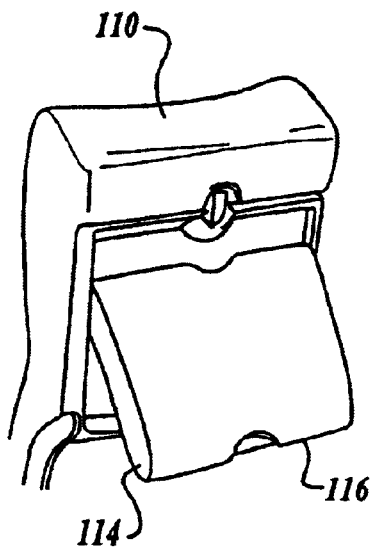

FIGS. 15A, 15B, and 15C depict the deployment of the outward facing comfort pad of the dual-toggle padded food tray 114 from seatback 110 to a passenger use position. In a side view shown in FIG. 15A, the dual-toggle padded food tray 114 is stowed into seatback 110 with padded surface 116 facing outward towards the passenger. As shown in side view of FIG. 15B, as lower toggle latch 118 is rotated, the comfort pad 116 falls downward with gravity with the spring-loaded pivots 130 sliding in slots 132. The angled comfort pad 116 is then secured via the pivot link 136. Pivot link 136 is shown secured to tray 114 with padded surface 116 angled face up. FIG. 15C shows an angular view where the comfort pad is secured in a face-resting position from seatback 110.

While the preferred embodiments of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A headrest for a passenger seat, the headrest being deployable from and stowable within the passenger seat, the headrest comprising:

a headrest platform;

an adjustable post connected to the headrest platform, the adjustable post having a tubular construction and defining a plurality of positioning holes;

a tubular bar defining a securing hole and a pivoting hole, the tubular bar being concentrically dimensioned to be slidably received within the adjustable post;

a first connector for securing the adjustable post to the tubular bar through the securing hole and at least one of the positioning holes; and a second connector for securing the tubular bar to the passenger seat through the pivoting hole, the headrest being pivotable to an inclination angle selectable by a passenger, the inclination angle having a range of motion which permits the headrest platform to be pivotable from a first position in back of a seated passenger to a second position in front of a seated passenger.

2. The headrest of claim 1, wherein the headrest platform further includes:

a plurality of sections, each section having an internal surface and an outer padded surface;

a hinge having a pivotal axis, wherein the hinge is in connection with the plurality of sections to allow pivotal rotation of the sections along the hinge axis, such that the sections open into an unfolded platform; and a locking device for securing the sections of the unfolded platform to each other.

3. The headrest of claim 2, wherein the headrest platform further includes:

a plurality of rotatable switches which rotate across the hinge axis to lock together the sections of the unfolded platform.

4. The headrest of claim 1, wherein the first connector further includes:

a housing;

a spring received in the housing; and a peg with a first end and a second end, the second end having a flange, wherein the first end is connected to the spring, the second end being protrudable through the securing hole and at least one positioning hole, wherein alignment of the securing hole and at least one positioning hole is selectable by a passenger to control and secure height extension of the platform.

* * * * *